United States Patent [19]
Van Erden et al.

[11] Patent Number: 5,242,736
[45] Date of Patent: * Sep. 7, 1993

[54] SEAMLESS TUBE USEFUL TO MAKE ROOFING BATTENS AND RELATED METHOD

[75] Inventors: Donald L. Van Erden, Wildwood; Juergen O. Rathgeber, Arlington Heights; Parimal M. Vadhar, Prospect Heights; John P. Wojcik, Long Grove, all of Ill.

[73] Assignee: Illinois Tool Works Inc., Glenview, Ill.

[*] Notice: The portion of the term of this patent subsequent to Nov. 10, 2009 has been disclaimed.

[21] Appl. No.: 719,981

[22] Filed: Jun. 24, 1991

Related U.S. Application Data

[63] Continuation-in-part of Ser. No. 631,219, Dec. 21, 1990, Pat. No. 5,161,342, which is a continuation of Ser. No. 294,324, Jan. 6, 1989, abandoned.

[51] Int. Cl.⁵ .................... F04D 5/14; F04D 5/06; F04G 21/14; B32B 3/24
[52] U.S. Cl. .................... 428/137; 428/131; 428/122; 428/127; 428/35.7; 428/910; 428/480; 428/188; 428/178; 428/463; 52/410; 52/417; 52/478; 52/461; 52/462
[58] Field of Search .............. 428/131, 137, 122, 127, 428/35.7, 910, 480, 188, 178, 483; 52/410, 417, 478, 461, 462

[56] References Cited
U.S. PATENT DOCUMENTS

| | | | |
|---|---|---|---|
| 3,857,917 | 12/1974 | Reade | 264/567 |
| 4,183,557 | 1/1980 | Hinden | 285/293 |
| 4,445,306 | 5/1984 | Schanuttele | 52/410 |
| 4,477,506 | 10/1984 | Wong | 428/172 |
| 4,567,068 | 1/1986 | Weinberg et al. | 428/131 |
| 4,950,511 | 8/1990 | Francis | 478/906 |
| 4,961,284 | 10/1990 | Williams | 47/66 |
| 4,963,430 | 10/1990 | Kish et al. | 428/220 |

*Primary Examiner*—Ellis P. Robinson
*Assistant Examiner*—William P. Watkins, III
*Attorney, Agent, or Firm*—Schwartz & Weinrieb

[57] ABSTRACT

A seamless tube useful in making a roofing batten is extruded from a polymeric material consisting essentially of a major amount of poly(ethylene terephthalate) and a minor amount of at least one polyolefin, flattened in a vacuum sizer so as to define two plies, and milled and drawn so as to orient the tube longitudinally. As milled and drawn, the tube is oriented so as to have a tensile strength of at least about 25,000 psi in a longitudinal direction. The plies are punched so as to have holes therethrough at spaced intervals along the tube. When used to make a roofing batten to coact with conventional fasteners, such as roofing screws, the tube exhibits superior characteristics of split resistance and pull-through resistance.

16 Claims, 2 Drawing Sheets ial. U.S. patent application Ser. No. 07/631,219 filed Dec. 21, 1990, now U.S. Pat. No. 5,161,342 which is a continuation patent application of Hasan et al., U.S. patent application Ser. No. 07/294,324 filed Jan. 6, 1989, now abandoned and assigned commonly herewith, for FASTENING SYSTEM, the disclosure of which is incorporated herein by reference.

SEAMLESS TUBE USEFUL TO MAKE ROOFING BATTENS AND RELATED METHOD

CROSS-REFERENCE TO RELATED APPLICATION

This application is a continuation-in-part of Hasan et al. U.S. patent application Ser. No. 07/631,219 filed Dec. 21, 1990, now U.S. Pat. No. 5,161,342 which is a continuation patent application of Hasan et al., U.S. patent application Ser. No. 07/294,324 filed Jan. 6, 1989, now abandoned and assigned commonly herewith, for FASTENING SYSTEM, the disclosure of which is incorporated herein by reference.

TECHNICAL FIELD OF THE INVENTION

This invention pertains to a seamless tube, which is useful in making a roofing batten, and to a related method of manufacture. As extruded from a polymeric material, the tube is flattened so as to define two plies and a substantially collapsed lumen and is oriented longitudinally, preferably so as to have a tensile strength of at least about 25,000 psi in a longitudinal direction.

BACKGROUND OF THE INVENTION

Roofing battens are used widely in securing flexible membranes to underlying materials. Mechanical fasteners, such as roofing screws, are passed through the battens, which may be pre-punched with holes to accommodate such fasteners. Typically, roofing battens comprise metal, wooden, or polymeric strips.

A polymeric material having particular utility in making a roofing batten is disclosed in Kish et al. U.S. Pat. No. 4,963,430. As disclosed therein, the polymeric material comprises a major amount of poly(ethylene terephthalate) and a minor amount of at least one polyolefin, such as polypropylene. As disclosed therein, such material can be substantially mono-axially oriented so as to have a tensile strength of at least about 25,000 psi in the oriented direction.

Other roofing battens made from polymeric materials are disclosed in Russell et al. U.S. Pat. No. 4,718,211 and in Schauffele U.S. Pat. No. 4,445,306. One possible arrangement of roofing battens on a roof is disclosed in Kelly U.S. Pat. No. 4,736,562.

It is disclosed in the copending patent application (Hasan et al. U.S. Ser. No. 07/294,324 filed Jan. 6, 1989, now abandoned) noted above that, as compared to a roofing batten having a single ply, a roofing batten having two plies with a combined thickness equal to the thickness of the single ply provides increased pull-through resistance when used with mechanical fasteners.

Heretofore, for purposes disclosed in the copending application noted above, it has been preferred to make a roofing batten with two plies, in one piece, from a wide strip by folding such strip longitudinally and using an adhesive to bond half portions of such strip to each other. It would be highly desirable to eliminate such strip-folding and adhesive-bonding steps.

A need has been created, to which this invention is addressed, for a better method of manufacturing a roofing batten with two plies.

SUMMARY OF THE INVENTION

In addressing the aforenoted need, this invention provides a novel article, namely a seamless tube useful in making a roofing batten. The seamless tube is extruded from a polymeric material, flattened so as to define two plies and a substantially collapsed lumen, and oriented longitudinally. The polymeric material may be any polymeric material that is capable of being extruded and that is capable of being oriented through drawing with or without compression.

Preferably, the polymeric material is similar to the polymeric material disclosed in Kish et al. U.S. Pat. No. 4,963,430 and contains a major amount of poly(ethylene terephthalate) and a minor amount of at least one polyolefin. Preferably, moreover, the tube is oriented so as to have a tensile strength of at least about 25,000 psi in a longitudinal direction.

Other polymeric materials that may be alternatively used include poly(ethylene terephthalate) and polyolefins, such as polypropylene. Polyamides (nylons) may be alternatively used. For making a roofing batten, the polymeric material disclosed in the Kish et al. patent noted above is preferred because of its superior characteristics of split resistance and pull-through resistance when used with mechanical fasteners, such as roofing screws.

So as to enhance the utility of the tube for making a roofing batten, the plies may have holes therethrough at spaced intervals along the tube so as to accommodate mechanical fasteners, such as roofing screws.

According to this invention, moreover, a seamless tube useful in making a roofing batten is manufactured by a novel method comprising steps of extruding a seamless tube from a polymeric material, flattening the tube so as to define two plies and a substantially collapsed lumen, and orienting the tube longitudinally. If the preferred material noted above is used, the tube may be then oriented so as to have a tensile strength of at least about 25,000 psi in a longitudinal direction. Furthermore, after the tube has been oriented, the plies may be desirably provided with holes therethrough at spaced intervals along the tube.

In a preferred mode for carrying out the novel method, the tube is extruded with a substantially opened lumen, whereupon the tube is flattened substantially by being sized in a vacuum sizer, which is arranged to flatten the tube and to provide the tube with a substantially elongate lumen. Thereupon, in the preferred mode, the tube is oriented by milling and drawing the tube. Finally, in the preferred mode, holes are provided through the tube at spaced intervals along the tube after the tube has been oriented.

Although a seamless tube according to this invention has particular utility when used to make roofing battens, it is contemplated that such a tube may have other similar and dissimilar uses.

These and other objects, features, and advantages of this invention are evident from the following description of a preferred embodiment of this invention with reference to the accompanying drawings.

DETAILED DESCRIPTION OF PREFERRED EMBODIMENT

Figure 1:
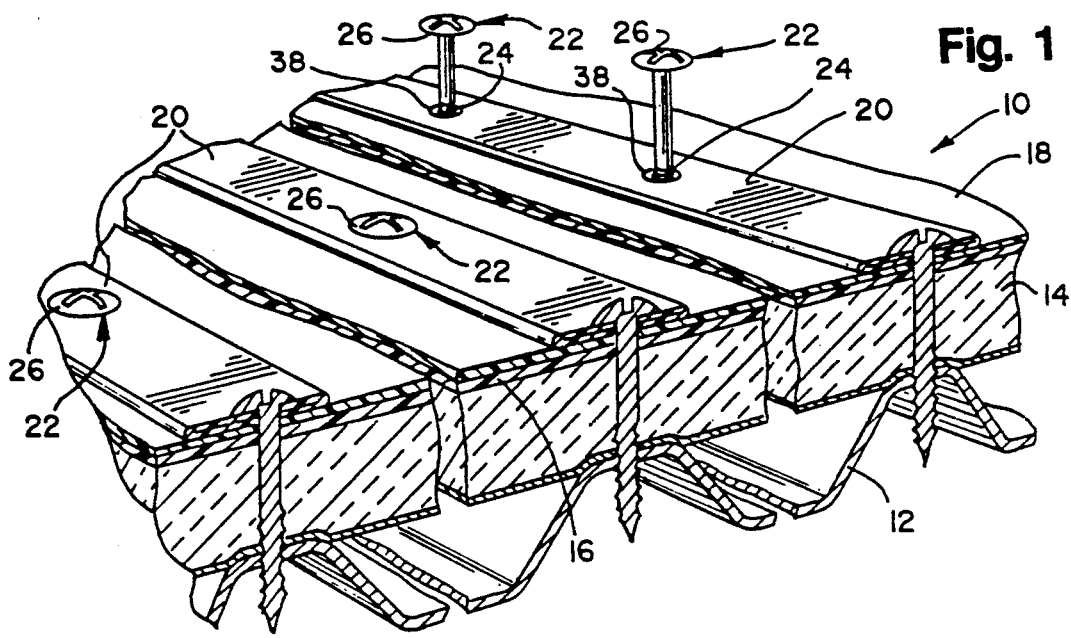
FIG. 1 is a fragmentary, perspective, partly exploded, vertical cross-sectional view of a roofing construction comprising a roofing deck, a slab of fibrous roofing insulation, two overlapped membranes, and plural roofing battens made from a seamless tube according to this invention, along with roofing screws coacting with such roofing battens.

As shown in FIG. 1, a roofing structure 10 incorporating this invention comprises a roofing deck 12 made of corrugated metal, a slab 14 of fibrous roofing insulation overlying the deck 12, one or possibly two roofing membranes made of a flexible, waterproof material, namely a lower membrane 16 covering the slab 14 and an upper membrane 18 covering the lower membrane 16, and plural roofing battens 20 overlying the upper membrane 18 at spaced intervals. Roofing screws 22 having threaded shanks 24 and enlarged heads 26 coact with the battens 20 to secure the membranes 16, 18, and the slab 14 to the deck 12. Thus, the battens 20 stabilize the membranes 16, 18, against ballooning excessively under wind loads. According to this invention, each batten 20 is made from a seamless tube 30, which is extruded from a polymeric material. The tube 30 is flattened, so as to have a substantially elongate lumen 32 and so as to define two plies 34, 36, and is oriented longitudinally. The plies 34, 36, are punched so as to have a series of holes 38 through the plies 34, 36, at spaced intervals along such tube 30. The holes 38 are dimensioned to permit the screw shanks 24 to pass through the holes 30 but not to permit the screw heads 26 to pass therethrough. The plies 34, 36, exhibit excellent pull-through resistance when used with mechanical fasteners, such as the screws 22.

Preferably, the tube 30 is extruded from the polymeric material disclosed in Kish et al. U.S. Pat. No. 4,963,430, the disclosure of which is incorporated herein by reference. Such material, when extruded and oriented, exhibits superior characteristics of split resistance and pull-through resistance when used with mechanical fasteners, such as the screws 22. As disclosed therein, the polymeric material contains a major amount (e.g., from about 80% to about 97% by weight) of poly-(ethylene terephthalate) and a minor amount (e.g., from about 3% to about 20% by weight) of at least one polyolefin, preferably polypropylene. As disclosed therein, the polyolefin may be a blend of polypropylene, maleic anhydride grafted polypropylene, and ethylene-propylene rubber. A preferred composition for the polymeric material is, by weight, approximately 92% poly(ethylene terephthalate), 6% polypropylene, 0.8% maleic anhydride grafted polypropylene, and 1.2% ethylene-propylene rubber.

Figure 4:
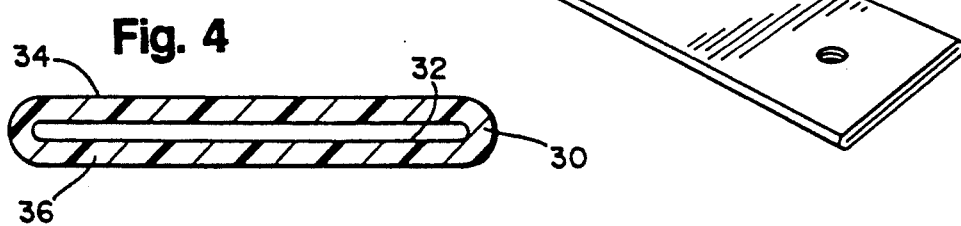
FIG. 4 is a cross-sectional view of the same tube, as flattened.

Preferably, the tube 30 is oriented longitudinally so as to have a tensile strength of at least about 25,000 psi in a longitudinal direction. It is disclosed in the Kish et al. patent noted above that a strip extruded from the polymeric material disclosed therein can be mono-axially oriented so as to have such a tensile strength. The tube 30 is extruded in an indeterminate length. Preferably, after the tube 30 has been flattened but before it is oriented, the tube 30 has a width of approximately 1.7 inches and a combined thickness of approximately 150 to 180 mils for the plies 34, 36, as shown in FIG. 4.

Figure 5:
FIG. 5 is a cross-sectional view of the same tube, as milled and drawn.

Preferably, after the tube 30 has been oriented, the tube 30 has a width of approximately one inch and a combined thickness of approximately 50 mils for the plies 34, 36, as shown in FIG. 5.

Figure 6:
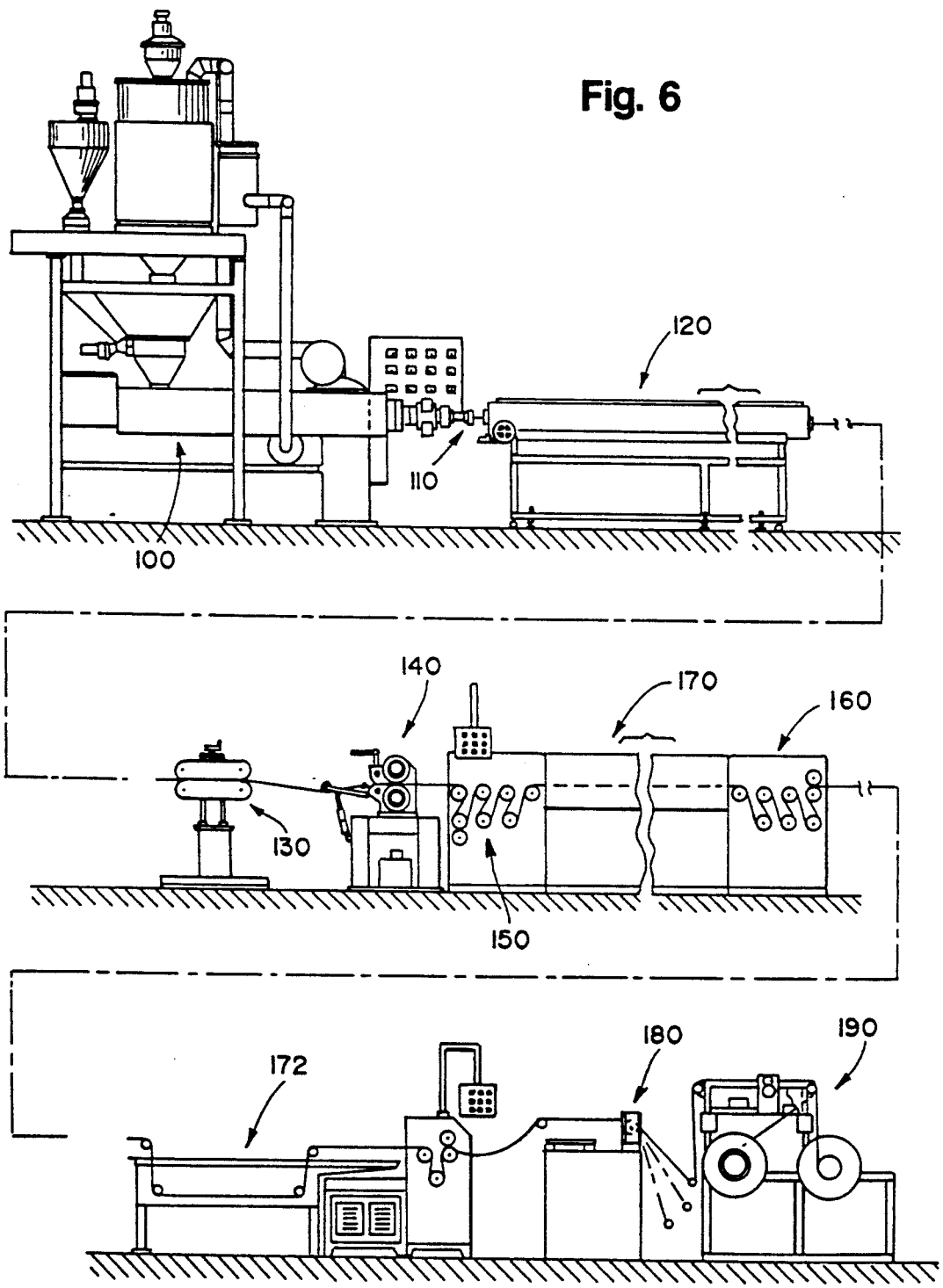
FIG. 6 is a diagrammatic representation of a processing line useful in manufacturing a seamless tube according to this invention.

As shown in FIG. 6, the roofing batten 10 can be efficiently manufactured in a processing line comprising known apparatus. The processing line is described below.

Figure 3:
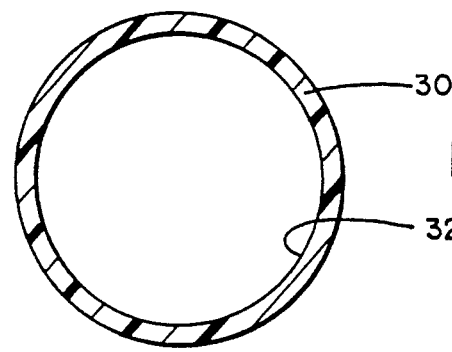
FIG. 3 is a cross-sectional view of the same tube, as extruded.
Figure 2:
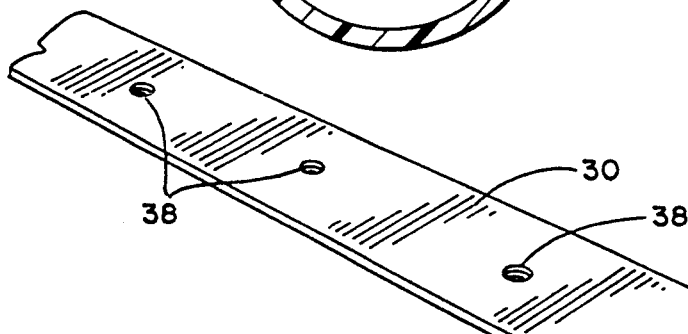
FIG. 2 is a fragmentary, perspective view of one end portion of a seamless tube according to this invention.

The respective constituents of a suitable composition, such as the preferred composition noted above, are fed into an extruder 100. In the extruder 100, such composition is blended, heated to a suitable temperature (e.g., a temperature in a range from approximately 520° F. to approximately 550° F.) so that such composition becomes plastic, and extruded through a suitable die 110 including a mandrel (not shown) so as to form a seamless tube 30. Preferably, the tube 30 is extruded so as to have a substantially circular mandrel 32, as shown in FIG. 3. The tube 30 may be alternatively extruded so as to have a differently shaped mandrel (not shown) such as a substantially rectangular mandrel.

While the tube 30 remains plastic, the tube 30 is fed through a vacuum sizer 120, in which the tube 30 is flattened so as to define two plies 34, 36, and in which the tube 30 is sized so as to have a substantially elongate lumen 32, as shown in FIG. 4. The tube 30 solidifies in the vacuum sizer 120, which prevents the plies 34, 36, from welding to each other before the tube 30 solidifies. Moreover, as discussed below, the plies 34, 36, do not weld to each other after the tube 30 solidifies. The tube 30 is pulled from the vacuum sizer 120 by a pair of endless belts 130.

Via the endless belts 130, the tube 30 is fed through a pair of milling rolls 140, which compress the tube 30 and causes the lumen 32 to be substantially collapsed. From the milling rolls 140, the tube is drawn over a set of first rollers 150 defining a first bridle. The first rollers 150 are rotated at surface speeds relative to the surface speeds of the milling rolls 140 so as to provide a draw ratio in a range from approximately 1.0 to approximately 1.2. Because of elastic recovery of the polymeric material leaving the milling rolls 140, a draw ratio of approximately 1.0 corresponds to an elongation of approximately 25%. Thus, as compressed by the milling rolls 140 and drawn by the first rollers 150, the tube 30 is oriented longitudinally.

From the first rollers 150, the tube 30 is fed through an annealing unit 170, in which the tube 30 is annealed at a suitable temperature (e.g., approximately 250° F.) so as to set the elongation of the tube 30. The tube 30 is then drawn over a set of second rollers 160 defining a second bridle. The second rollers 160 are rotated at surface speeds relative to the surface speeds of the first rollers 150 so as to define a draw ratio of approximately 0.95.

The annealed tube 30 is then driven through a water bath 172, which cools the tube 30.

From the water bath 172, the tube 30 is fed through a punching unit 180, in which the holes 38 are punched through the plies 34, 36. From the punching unit 180, the tube 30 is fed into a winding unit 190, in which the flattened, oriented, punched tube 30 is wound onto spools. The tube 30 may be then cut into suitable lengths, each to constitute a roofing batten, as exemplified by the roofing battens 20.

As mentioned above, the plies 34, 36, do not weld to each other when the tube 30 is flattened. Unexpectedly, the plies 34, 36, do not weld to each other when the tube 30 is milled, drawn, and annealed.

An alternative method for making a seamless tube according to this invention is contemplated, in which such milling rolls are not used, and in which the flattened tube is oriented by being drawn over a short gap between two sets of rollers being rotated at different speeds.

Having superior characteristics of split resistance and pull-through resistance, a roofing batten made from a seamless tube according to this invention performs as well as the two-ply batten disclosed in the copending application (Hasan et al. U.S. Ser. No. 07/294,324 filed Jan. 6, 1989) noted above.

As a possible modification of the preferred embodiment described above, the plies of the seamless tube may be adhesively bonded to each other, via an adhesive introduced before the tube is milled.

Various other modifications may be also made in the preferred embodiment described above, and in the processing line described above, without departing from the scope and spirit of this invention.

We claim:

1. A roofing batten, for securing roofing materials to a roofing substructure as a result of said roofing batten being disposed atop said roofing materials and being secured to said roofing substructure by means of a plurality of fasteners arranged in longitudinally extending, laterally spaced rows and passing through said roofing batten, said roofing materials, and said roofing substructure, comprising:

a seamless tubular member extruded from a polymeric material and having a longitudinal axial extent wherein said polymeric material is oriented in the direction of said longitudinal axial extent;

a seamless tubular member being flattened along said longitudinal axial extent so as to define two superimposed roofing batten plies which are integrally connected together along oppositely dispose, laterally space, longitudinally extending side edge portions thereof and wherein a substantially collapsed lumen is defined between said two superimposed roofing batten plies, and wherein further, said seamless tubular member has an axial length as a result of being cut transversely with respect to said longitudinal axial extent at an axial position along said longitudinal axial extent so as to thereby define said axial length of said roofing batten which extends at least between tow axially spaced positions at which at least two of said plurality of fasteners, arranged within said longitudinally extending, laterally spaced, rows, are capable of being disposed; and means defining apertures extending through both of said two superimposed roofing batten plies of said roofing batten, and axially spaced along said longitudinal axial extent throughout said longitudinal axial length of said roofing batten, wherein each aperture in one of said two superimposed roofing batten plies is coaxially aligned with an aperture in the other of said two superimposed roofing batten plies, for receiving said plurality of fasteners for securing said roofing batten atop said roofing materials and to said roofing substructure.

2. A roofing batten as set forth in claim 1, wherein:
said polymeric material is oriented so as to have a tensile strength of at least approximately 25,000 psi along said longitudinal axial extent.

3. A roofing batten as set forth in claim 1, wherein:
said polymeric material comprises a major amount of poly (ethylene terephthalate) and a minor amount of at least one polyolefin.

4. A roofing batten as set forth in claim 2, wherein:
said polymeric material comprises a major amount of poly(ethylene terephthalate) and a minor amount of at least one polyolefin.

5. A roofing batten as set forth in claim 3, wherein:
said major amount of poly(ethylene terephthalate) comprises approximately 80–97% by weight; and
said minor amount of said polyolefin comprises approximately 3–20% by weight.

6. A roofing batten as set forth in claim 5, wherein:
said polyolefin comprises polypropylene.

7. A roofing batten as set forth in claim 5, wherein:
said polyolefin comprises a blend of polypropylene, maleic anhydride grafted polypropylene, and ethylene-propylene rubber.

8. A roofing batten as set forth in claim 7, wherein:
said polymeric material comprises approximately 92% by weight poly(ethylene terephthalate), 6% by weight polypropylene, 0.8% by weight maleic anhydride grafted polypropylene, and 1.2% by weight ethylene-propylene rubber.

9. A roofing batten to be used in connection with a building structure substrate upon which at least one flexible, water-impervious sheet membrane is disposed so as to seal said building structure substrate against liquid penetration, said at least one flexible, water-impervious sheet membrane being capable of being affixed to said building structure substrate by means of a plurality of mechanical fasteners arranged within a plurality of laterally spaced, longitudinally extending rows, said roofing batten to be disposed atop said at least one flexible, water-impervious sheet membrane and comprising:

a flexibly resilient, thermoplastic seamless tubular member having a longitudinal axial extent wherein the thermoplastic material of said seamless tubular member is oriented in the direction of said longitudinal axial extent and said thermoplastic seamless tubular member is flattened along said longitudinal axial extent so as to comprise two superimposed roofing batten plies which are integrally connected together along oppositely disposed, laterally spaced, longitudinally extending side edge portions thereof, and wherein further, a substantially collapsed lumen is defined between said two superimposed roofing batten plies, said seamless tubular member having an axial length as a result of being cut transversely with respect to said longitudinal axial extent at an axial position along said longitudinal axial extent so as to thereby define said axial length of said roofing batten which extends at least between two axially spaced positions at which at least two of said plurality of fasteners, arranged within said longitudinally extending, laterally spaced, rows, are capable of being disposed; and means defining a plurality of apertures arranged in a longitudinal array along said longitudinal axial extent of said flattened tubular member, and extending through both of said two superimposed roofing batten plies of said roofing batten wherein each aperture in one of said two superimposed roofing batten plies is coaxially aligned with an aperture in the other of said two superimposed roofing batten plies, for respectively receiving said plurality of mechanical fasteners so as to secure said roofing batten atop said at least one flexible, water-impervious sheet membrane and thereby, in turn, secure said at least one flexible, water-impervious sheet membrane to said building structure substrate.

10. A roofing batten as set forth in claim 9, wherein:
said tubular member comprises a polymeric material which is oriented so as to have a tensile strength of at least approximately 25,000 psi along said longitudinal axial extent.

11. A roofing batten as set forth in claim 9, wherein:
said tubular member comprises a polymeric material which comprises a major amount of poly(ethylene terephthalate) and a minor amount of at least one polyolefin.

12. A roofing batten as set forth in claim 10, wherein:
said polymeric material comprises a major amount of poly(ethylene terephthalate) and a minor amount of at least one polyolefin.

13. A roofing batten as set forth in claim 11, wherein:
said major amount of poly(ethylene terephthalate) comprises approximately 80-97% by weight; and
said minor amount of said polyolefin comprises approximately 3-20% by weight.

14. A roofing batten as set forth in claim 13, wherein:
said polyolefin comprises polypropylene.

15. A roofing batten as set forth in claim 13, wherein:
said polyolefin comprises a blend of polypropylene, maleic anhydride granted polypropylene, and ethylene-propylene rubber.

16. A roofing batten as set forth in claim 15, wherein:
said polymeric material comprises approximately 92% by weight poly(ethylene terephthalate), 6% by weight polypropylene, 0.8% by weight maleic anhydride grafted polypropylene, and 1.2% by weight ethylene-propylene rubber.

* * * * *